United States Patent [19]

Halbherr

[11] Patent Number: 4,664,140
[45] Date of Patent: May 12, 1987

[54] REVERSING VALVE

[75] Inventor: Gerd Halbherr, Bochum, Fed. Rep. of Germany

[73] Assignee: Dr. C. Otto & Comp. GmbH, Bochum, Fed. Rep. of Germany

[21] Appl. No.: 758,372

[22] Filed: Jul. 24, 1985

[30] Foreign Application Priority Data

Aug. 16, 1984 [DE] Fed. Rep. of Germany ... 8424185[U]

[51] Int. Cl.⁴ ............................................. F16K 5/22
[52] U.S. Cl. .......................... 137/246.11; 137/246.22
[58] Field of Search .............. 137/246, 246.11, 246.12, 137/246.22

[56] References Cited

U.S. PATENT DOCUMENTS

| 1,755,406 | 4/1930 | Nordstrom | 137/246.11 |
| 1,937,122 | 11/1933 | Leach | 137/246.12 |
| 2,145,628 | 1/1939 | Milliken | 137/246.22 |
| 3,094,136 | 6/1963 | Bredtschneider et al. | 137/246.11 |
| 3,183,925 | 5/1965 | Hoyle et al. | 137/246.22 |
| 4,498,498 | 2/1985 | Martinez-Vera et al. | 137/613 |

FOREIGN PATENT DOCUMENTS 2742134  3/1978  Fed. Rep. of Germany ...................... 137/246.11

Primary Examiner—Alan Cohan
Assistant Examiner—John A. Rivell
Attorney, Agent, or Firm—Thomas H. Murray; Clifford A. Poff

[57] ABSTRACT

There is disclosed a reversing valve for use with a regenerative coke oven, in which the valve cock is lubricated, having four spaced longitudinally extending lubrication grooves that communicate with lubrication means when the valve is in one of its desired end positions, either open or closed. In a preferred embodiment, means are also provided for introducing degraphitizing air into the grooves, in certain positions of the valve cock.

4 Claims, 2 Drawing Figures

REVERSING VALVE

BACKGROUND OF THE INVENTION

1. Field of the Invention

The invention relates to a reversing valve for the supply of hot gas for reversing coke ovens, in which at predetermined time intervals of, for example, twenty to thirty minutes, there is undertaken a reversal of the hot-gas valve, consisting of a conical valve cock that is pivotable with the leaving free of an adjustable space in the valve housing, whereby the valve cock possesses an I-bore, through which in the open position there is gas transmission, while in the position of having been revolved by ninety degrees, the gas supply is cut off, and whereby the valve cock is provided with lubricating grooves which run in the longitudinal direction, which grooves are not extended to the front faces of the the valve cock.

2. Description of the Prior Art

Such reversing valves, in which the valve cock is held with the aid of adjusting nuts and a pressure bearing in an exactly established position, have, in comparison with such other valves which likewise are known to the prior art, in which the cock is drawn into the cock housing by means of a spring, the advantage, that the space for the lubricating-film thickness is adjustable according to the kind of lubricant used, and the necessary pressure of the cock, exactly by means of a mirror. There also exists the danger, that the lubricating film will be wrung away during the reversal by the spring pressure working on the valve, so that the lubricating film remains held. Outlets of gas into the atmosphere are avoided by the reversing valves, in that they are provided on both ends with housing covers.

The invention addresses and solves the problem of effecting the lubrication of the reversing valve in such manner that the entire bearing surface between the valve cock and the inner walls of the housing is automatically and constantly provided or supplied with lubricant.

BRIEF SUMMARY OF THE INVENTION

There is disclosed a reversing valve for use with a regenerative coke oven, in which the valve cock is lubricated, having four spaced longitudinally extending lubrication grooves that communicate with lubrication means when the valve is in one of its desired end positions, either open or closed. In a preferred embodiment, means are also provided for introducing degraphitizing air into the grooves, in certain positions of the valve cock.

DESCRIPTION OF THE DRAWINGS

A complete understanding of the invention may be obtained from the foregoing and following description thereof, taken in conjunction with the appended drawings, in which.

DESCRIPTION OF THE PREFERRED EMBODIMENTS

Figure 1:
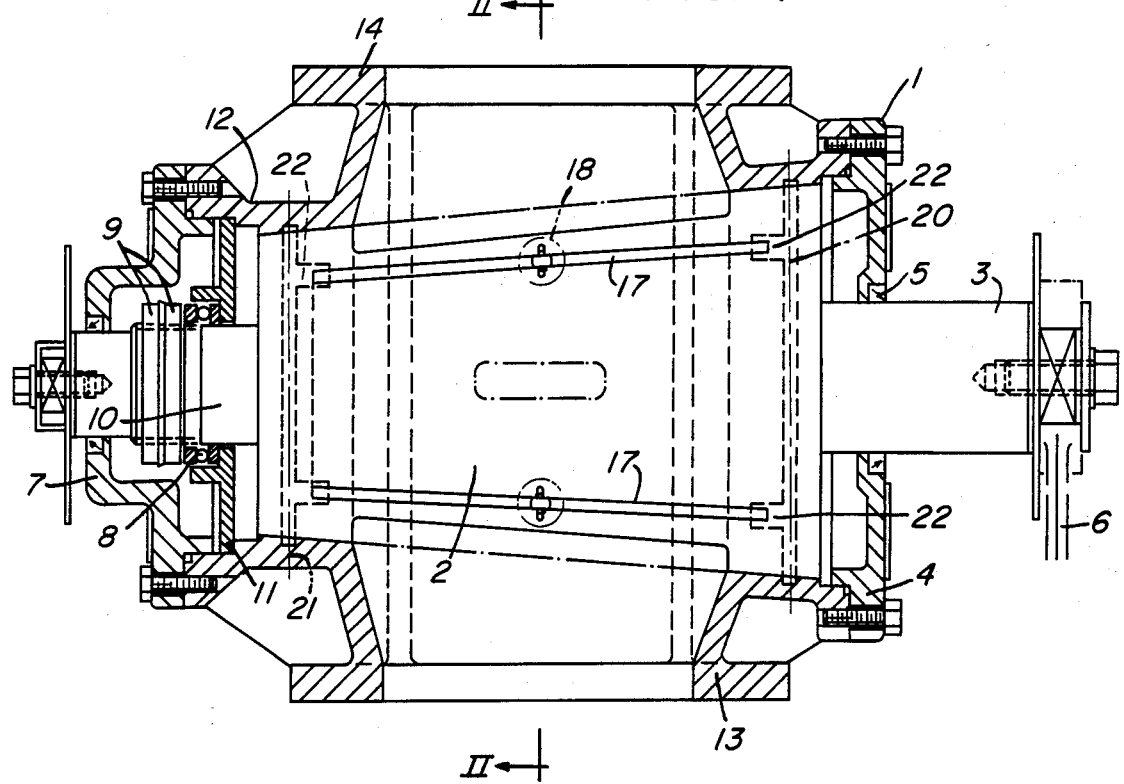
FIG. 1 is a central longitudinal section through a reversing valve according to the invention.

Starting from a reversing valve of the kind initially described, the invention consists in the features that on the upper surface of the valve cock there are provided four lubricating grooves which are spaced apart and run in the longitudinal direction, that the valve housing is provided with two diametrically opposed lubricating devices, which in the open position of the valve are in the neighborhood of two diametrically opposed lubricating grooves and in the closed position are in the region of the two others of the opposed lubricating grooves, and in that in the vicinity of the ends of the housing on each of whose bearing surfaces a surrounding ring groove is brought to bear, which contains four pockets evenly dispersed about the periphery of the housing, which extend in opposing direction to the adjacent forward surfaces and in their vicinity, the lubricating grooves end in both end positions of the reversing valve.

It has turned out to be expedient, to arrange the lubricating means in two diametrically opposed positions in the vicinity of the horizontal central plane of the reversing valve. Moreover, it is a feature of the invention that the valve housing is provided, in the vicinity of the mouths of the openings of the lubricating means, with a take-off.

In accordance with the arrangement of the pockets according to the invention, which stand in combination with the ring grooves provided in the vicinity of the ends of the housing and in the end portions of the reversing valve with the longitudinal grooves of the reversing valve, it is obtained, that the initial pressure of the lubricant in the ring valves is maintained, if the longitudinal lubricating valves glide over the access openings of the housing. The longitudinal grooves of the reversing valves are provided with lubricant only in the two end positions. Directly after the beginning of a reversal movement of the valve, there is broken the connection of the lubricant pocket with the longitudinal groove, so that the initial pressure of the lubricant in the shut-off ring grooves is held the same. The lubricant located in the longitudinal grooves insures, during the reversal movement, the maintenance of a lubricant film, whose thickness among other things depends upon the position of the reversing valve in relation to the valve housing, which is regulable with the help of adjusting screws.

The reversing valve consists of a housing 1 with a conical seat surface and frustroconical cock 2 therefor, the activating plug of which is conducted imperviously through a removable lid or cover 4. The projection of the plug 3 through the cover is sealed with a ring 5. The outer end of the plug is connected with the rod 6 of a surrounding apparatus, with which the valve can be turned at predetermined time intervals through ninety degrees. On the opposed ends, housing 1 is also closed with a removable cover 7. The valve 2 is so positioned by means of a pressure bearing and adjustable nuts that it is held in an exactly predetermined position with the formation of a gap between its upper face and the bearing surface of the housing.

The housing is provided with two connections 13 and 14 for the gas conduits (not shown on the drawing). With the inner openings of these pieces, there communicate two openings 15 and 16 which are provided at the walls of the cock, if the cock is in the open position.

As is shown in the drawing, there are provided on the upper surface of the valve four longitudinal grooves 17, which are formed as pocket grooves, that is, ones that do not extend to the front faces of the valve. The longitudinal grooves are regularly distributed about the periphery of the bearing surface of the valve; they have an angular difference of ninety degrees from one another. The housing 1 contains two diametrically opposed lubrication means 18, by which it can be connected through a lubricating nipple or a connector to a central lubricating means. The lubricating means, as shown in FIG. 1, lie, in the described embodiment of the invention, in the horizontal central plane of the reversing valve, and, as can be seen from FIG. 2, in connection with two opposed longitudinal grooves 17, if the valve is located in either of its end positions. In the region of the exit of the openings of the lubrication means, the inner surface of the housing is provided with a take-off 19.

In the vicinity of the ends of the housing, there is brought in its inner walls, further, each a closed ring groove 20 or 21. The ring grooves contain each four pockets 22, which extend in opposed direction of the front walls of the housing and are arranged at the places at which the longitudinal grooves 17 are located, if the valve is located in either one or the other end position. The longitudinal grooves end in the region of these pockets 22. The pockets are preferably somewhat broader than than the longitudinal grooves.

Figure 2:
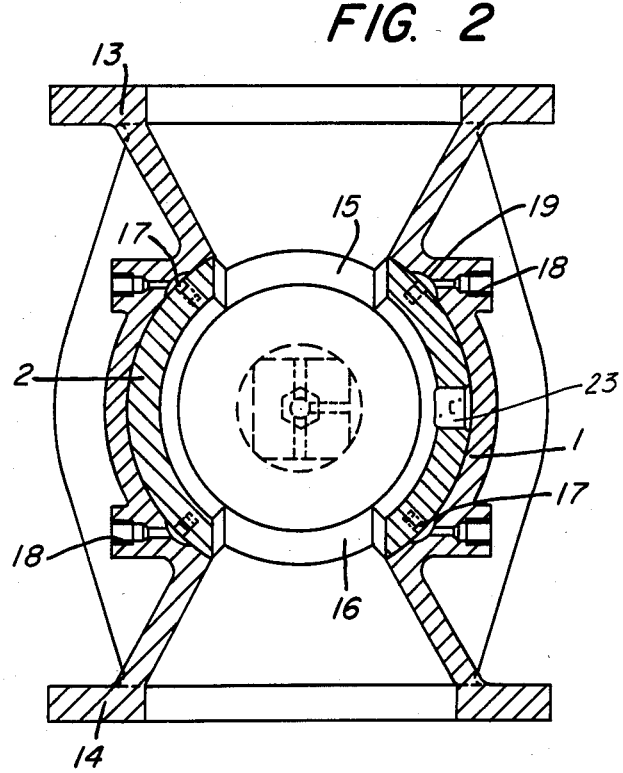
FIG. 2 is a section taken on the line II—II of FIG. 1.

The apparatus works as follows:

The position shown in the drawing is the open position; that is, the openings 15 and 16 of the reversing valve are open on both sides. In this position, the hot gas can flow through the surrounding valve. Around it there stand, as FIG. 2 shows, two oppositely positioned longitudinal grooves 17 of the valve connected with the two lubrication means 18, so that the lubrication medium can enter into these longitudinal grooves. At the same time, there is a connection through each of the two pockets 22 between these longitudinal grooves and the two ring grooves 20 and 21, so that the lubrication medium may extend also into the ring grooves. With a rotation of the reversing valve of ninety degrees, in which the transmission openings are closed, the lubrication medium divides itself regularly on the bearing surfaces between the reversing valve and the housing. In this end portion, the other two longitudinal grooves 17 stand in connection with the lubrication apparatus, so that the lubrication medium presses correspondingly through these longitudinal grooves and the pockets in communication therewith into the upper and lower ring spaces. In this manner, there is assured an automatic and regular lubrication of the surrounding valve.

The reversing valve can contain in one of the closed walls a further opening, which can be seen in the drawing and is designated with the reference numeral 23.

The opening 23 is arranged at an angle of ninety degrees with respect to the openings 15 and 16. In this case, the housing is also provided with a further port (not shown), to which there may be connected a conduit for degraphitizing air. Thus, there exists the possibility of introducing degraphitizing air into the gas conduits, if the valve is in the position in which the opening 23 of the reversing valve communicates with the opening of the third line, wherein the reversing valves is in the open position. By a turning of the valve through 180 degrees, the introduction of the degraphitizing air can be shut off.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A reversing valve for the supply of hot gas for a reversing regenerative coke oven, in which at predetermined time intervals of, for example, twenty to thirty minutes, there is conducted a reversal of the hot-gas valve, consisting of a conical valve cock which is pivotable with the leaving-free of an adjustable space in a valve housing, wherein the valve cock possesses an I-bore through which gas is transmitted in the open position, whereas, in a position turned by ninety degrees, the gas flow is shut off, and wherein the valve cock is provided with lubricating grooves which run in its longitudinal direction and which do not extend to the front faces of the valve cock, characterized in that on the upper face of the valve cock, there are provided four lubrication grooves which run in the longitudinal direction of the valve cock and are regularly distributed about its periphery, that the valve housing is provided with two diametrically opposed lubrication means, which are, in the open position of the valve, in the region of two diametrically opposed lubrication grooves, and, in the closed position of the valve, are in the region of the remaining two of the four diametrically opposed lubricating grooves, and that in the vicinity of the ends of the housing on each of whose bearing surfaces there is provided a surrounding ring groove, which contains four pockets, which are regularly arranged about the periphery of the housing, which extend in opposed direction of the adjacent forward surfaces and in the vicinity of which the lubrication grooves end in both of the two end positions of the reversing valve.

2. A reversing valve according to claim 1, characterized in that the lubricating means are arranged on two diametrically opposed places in the vicinity of the horizontal central plane of the reversing valve.

3. A reversing valve according to claim 2, characterized in that the valve housing is provided, in the vicinity of the mouths of the openings of the lubricating means, with a takeoff.

4. A reversing valve according to claim 1, characterized in the the valve housing is provided, in the vicinity of the mouths of the openings of the lubricating means, with a takeoff.

* * * * *